US011465935B2

(12) United States Patent
Devys et al.

(10) Patent No.: US 11,465,935 B2
(45) Date of Patent: Oct. 11, 2022

(54) ITEM PROTECTED BY A ROUGH TEMPORARY PROTECTIVE COVER

(71) Applicant: SAINT-GOBAIN GLASS FRANCE, Courbevoie (FR)

(72) Inventors: Lucie Devys, Paris (FR); François Guillemot, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 142 days.

(21) Appl. No.: 16/608,456

(22) PCT Filed: Apr. 24, 2018

(86) PCT No.: PCT/FR2018/051025
§ 371 (c)(1),
(2) Date: Oct. 25, 2019

(87) PCT Pub. No.: WO2018/197803
PCT Pub. Date: Nov. 1, 2018

(65) Prior Publication Data
US 2020/0199017 A1      Jun. 25, 2020

(30) Foreign Application Priority Data

Apr. 28, 2017   (FR) ...................................... 1753773

(51) Int. Cl.
*C03C 17/42*       (2006.01)
*C03C 17/36*       (2006.01)
*C03C 17/38*       (2006.01)

(52) U.S. Cl.
CPC .......... *C03C 17/42* (2013.01); *C03C 17/3639* (2013.01); *C03C 17/3644* (2013.01);
(Continued)

(58) Field of Classification Search
CPC . C03C 17/42; C03C 17/3639; C03C 17/3644; C03C 17/38; C03C 2217/78;
(Continued)

(56) References Cited

U.S. PATENT DOCUMENTS

| 2007/0248756 A1* | 10/2007 | Krisko ................ C03C 17/3423 427/255.15 |
| 2009/0075069 A1* | 3/2009 | Myli ..................... C23C 14/024 428/336 |
| 2013/0115468 A1* | 5/2013 | Kharchenko ....... C03C 17/3644 428/426 |

FOREIGN PATENT DOCUMENTS

EP      2 297 057 A2    3/2011
FR      2 990 384 A1    11/2013
(Continued)

OTHER PUBLICATIONS

International Search Report as issued in International Patent Application No. PCT/FR2018/051025, dated Jul. 10, 2018.

*Primary Examiner* — Nathan L Van Sell
(74) *Attorney, Agent, or Firm* — Pillsbury Winthrop Shaw Pittman LLP

(57) ABSTRACT

An article includes a glass substrate including two main faces defining two main surfaces separated by edges and a temporary protective layer comprising an organic polymer matrix deposited on at least one portion of a main surface of the glass substrate, wherein the temporary protective layer has a rough surface defined by a surface roughness parameter Sa, corresponding to the arithmetic mean height of the profile of the surface, of greater than 0.2 µm.

13 Claims, 1 Drawing Sheet

(52) U.S. Cl.
CPC .......... *C03C 17/38* (2013.01); *C03C 2217/78* (2013.01); *C03C 2218/118* (2013.01); *C03C 2218/156* (2013.01); *C03C 2218/355* (2013.01)

(58) Field of Classification Search
CPC ......... C03C 2218/118; C03C 2218/156; C03C 2218/355; C03C 17/3602; C03C 17/3657
See application file for complete search history.

(56) References Cited

FOREIGN PATENT DOCUMENTS

| | | | | |
|---|---|---|---|---|
| JP | 4397498 B2 | * | 1/2010 | |
| JP | 2015223725 A | * | 12/2015 | |
| WO | WO 2009/153490 A2 | | 12/2009 | |
| WO | WO-2012105408 A1 | * | 8/2012 | ........... B32B 17/064 |
| WO | WO-2012105413 A1 | * | 8/2012 | ........... B32B 17/064 |
| WO | WO 2015/019022 A1 | | 2/2015 | |
| WO | WO-2015019022 A1 | * | 2/2015 | ............... C09D 5/20 |

\* cited by examiner

ITEM PROTECTED BY A ROUGH TEMPORARY PROTECTIVE COVER

CROSS-REFERENCE TO RELATED APPLICATIONS

This application is the U.S. National Stage of PCT/FR2018/051025, filed Apr. 24, 2018, which in turn claims priority to French patent application number 1753773 filed Apr. 28, 2017. The content of these applications are incorporated herein by reference in their entireties.

The invention relates to articles comprising glass substrates optionally coated with a functional coating that are protected by a temporary protective layer. These articles are intended to be thermally toughened.

Most flat glass substrates are manufactured in the form of a continuous ribbon, for example a continuous ribbon of float glass or of cast glass. These glass substrates referred to as large-format jumbo (PLF) glass substrates are obtained directly by transverse cutting through the glass ribbon. These glass substrates therefore have at least one dimension, in general the width, corresponding to the width of the glass ribbon from which they are derived. The other dimension, in general the length, corresponds to the length of cut ribbon. Jumbo glass substrates typically have dimensions of 3.21 m by around 6 m.

These glass substrates may be coated with a functional coating. It is known to use articles comprising substrates bearing functional coatings in order to give said substrates optical properties (mirror or antireflection layers), thermal properties (low-emissivity, solar control or solar-protection layers, in particular based on silver layers) or electrical properties (antistatic layers, transparent conductive layers). These functional coatings may be deposited directly on the large-format jumbo glass substrates.

These substrates are subjected to various processing steps such as steps of cutting, washing, shaping the edges, assembling and heat treatments of tempering type. It is common and practical to carry out the assembling and/or the various treatments at a site other than the one where the substrate bearing the functional coating is manufactured. These substrates are therefore also subjected to storage and transport steps.

During the transport or storage steps, or between two processing steps, it is in general necessary to stack several substrates for a time ranging from several hours to several months. The following steps can in particular be listed:
- the step of storing the substrates optionally after deposition of the functional coating at the production site,
- the step of moving the substrates, from the production site to the processing site,
- the step of storing at the processing site,
- between the cutting step and the step of shaping the edges,
- between the step of shaping the edges and the washing step,
- between the washing step and the tempering step.

The storage and handling of these glass substrates poses a real problem. On the one hand, during all the steps of handling the substrates, there is a risk of soiling or scratching the glass substrates and/or the functional coatings. But above all, stacked glass substrates have a tendency to adhere to one another so that it is difficult to separate them. This phenomenon is mainly due to the presence of water which condenses between two substrates. Consequently, the adhesion of the substrates to one another is even more pronounced when the substrates are stored slightly wet, for example after the washing step.

Many solutions have been proposed to overcome the problem linked to the storage of glass substrates in particular in a wet environment. Some aim specifically to prevent the adhesion of the glass substrates to one another. The glass substrates are customarily transported and stored stacked in a slightly inclined vertical position, and separated from one another either by air spaces or by means of interlayer materials. Among the interlayer materials used, mention may be made of paper, cords, cardboard and polymer beads in particular poly(methyl methacrylate) beads.

These various solutions are not entirely satisfactory. Indeed, it is sometimes difficult to put these interlayer materials in place without soiling or scratching the glass substrates and/or the functional coatings.

It would be particularly advantageous to have a solution that makes it possible to store glass substrates in contact with one another:
- without particular care, the substrates being able to be simply stacked horizontally or vertically,
- without risk of adhesion, regardless of the presence of water originating from ambient humidity or of residual water resulting for example from a washing step.

The Applicant has discovered that the use of a rough temporary protective layer intended to be removed during a tempering-type heat treatment makes it possible to achieve these results.

The invention relates to an article comprising a glass substrate comprising two main faces defining two main surfaces separated by edges and a temporary protective layer comprising an organic polymer matrix deposited on at least one portion of a main surface of the glass substrate, characterized in that the temporary protective layer has a rough surface defined by a surface roughness parameter Sa, corresponding to the arithmetic mean height of the profile of the surface, of greater than 0.2 µm.

The invention also relates to a process for obtaining an article treated at high temperature. The article comprises a glass substrate comprising two main faces defining two main surfaces separated by edges, said glass substrate bearing a functional coating deposited on at least one portion of a main surface. The process comprises the following steps:
a step of protecting the article comprising:
- preparing a polymerizable composition,
- applying and crosslinking the polymerizable composition on at least one portion of the substrate optionally coated with the functional coating so as to form a temporary protective layer having a thickness of at least 1 micrometer and a rough surface defined by a surface roughness parameter Sa, corresponding to the arithmetic mean height of the surface, of greater than 0.2 µm, a same step of heat treating and deprotecting the article comprising:
- removing the temporary protective layer by high-temperature heat treatment of tempering, annealing and/or bending type, in particular at a temperature above 200° C., above 300° C., or above 400° C.

Glass substrates comprising such a layer can be stacked and stored without particular care. The solution of the invention enables a time saving and considerable economies for the processing company which no longer has to worry about the storage or handling conditions. It is then possible to dispense with specifically dedicated expensive equipment such as shelving and interlayer materials.

The Applicant has developed a temporary protective layer specifically used to protect glass substrates intended to be thermally tempered. These protective layers, described in application WO 2015/019022, are described as "temporary" since they are removed during the tempering by thermal decomposition.

The thermal tempering consists in bringing a glass substrate to a temperature close to its softening point (from 570° C. to 700° C., depending on its composition) and in cooling it rapidly.

The objective of the temporary protective layers described in application WO 2015/019022 is to protect the articles from scratches and corrosion during storage, in particular in a wet environment. These temporary layers are not used for the purpose of optimizing the storage conditions and in particular dispensing with the use of interlayer materials.

The Applicant has surprisingly discovered that it is possible to easily impart a particular roughness to these temporary protective layers, via various processes. The combination of the choice of this roughness, of the organic nature of the protective layer and of sufficient thicknesses, makes it possible to effectively protect glass substrates regardless of the storage or handling conditions or the processing steps. The rough temporary protective layer enables glass substrates to be stacked, even when the substrates are wet, with no risk of adhesion between substrates and without using interlayer materials.

The roughness enables the run-off and evaporation of the water. The presence of a layer of air between the stacked substrates is maintained. Furthermore, even if a quantity of water remains trapped between a glass substrate and the rough temporary protective layer of another glass substrate, the contact area with this quantity of water is limited. Now the adhesion between two substrates is a function of the capillary force. The capillary force depends on the size of the contact areas. By limiting the contact areas, the capillary forces, and therefore the adhesion of the substrates to one another, are limited.

Nothing in application WO 2015/019022 indicated that such roughnesses could be obtained. This application does not contain any indication regarding the roughness of the temporary protective layers.

Only experiments aimed at optimizing the storage conditions have made it possible to demonstrate a beneficial effect directly attributable to the use of a temporary protective layer having a particular thickness and a particular roughness.

The solution of the invention is even more advantageous when the glass substrate is coated with a functional coating. Many functional coatings deposited on substrates have a low mechanical strength, in particular a high scratchability and a low abrasion resistance. During storage, if the adhesion between two substrates occurs on the side of the functional coating, the risk of damaging the functional coating is high. The temporary protective layer according to the invention, by preventing adhesion between two substrates, perfectly protects the coated substrates.

The temporary protective layer is preferably deposited and crosslinked through suitable means that can be directly integrated at the outlet of the float process or of the functional coating deposition chamber. This makes it possible to prevent any contamination of the optionally coated substrates and to continuously manufacture protected articles.

The formulation of the temporary layer is suitable for being completely removed following the heat treatment without damaging the optical properties of the substrate bearing the functional coating.

The temporary protective layer is obtained from a polymerizable composition. The temporary protective layer comprises a polymer matrix. The polymer matrix is essentially of organic nature. This matrix results from the crosslinking of the polymerizable organic compounds present in the polymerizable composition.

The claimed roughness may be obtained in various ways.

According to a first embodiment, the deposition conditions of the polymerizable composition are chosen in order to obtain a temporary protective layer having the required thickness and roughness. The deposition conditions are in particular the viscosity and the rate of deposition for the polymerizable composition. The rate of deposition depends on the choice of the deposition device. For example, for roll coating, the rate of deposition depends on the choice of the run speed of the substrate and/or the speed of the roll.

The Applicant has discovered that it is possible to deposit, by roll coating, a temporary protective layer that has flatness defects in the form of wavelets at the surface. These wavelets are parallel to the axis of rotation of the deposition roll.

This roughness, in the form of wavelets, is obtained by creating an instability, in particular by choosing a high capillary number (Ca). The capillary number is a dimensionless number representing the ratio between the viscous forces and the surface tension. It is defined in the following way: $Ca=(v \times \eta)/\sigma$
with:
v: the rate of deposition of the polymerizable composition,
$\eta$: the dynamic viscosity,
$\sigma$: the surface tension of the polymerizable composition The polymerizable composition is then crosslinked. According to this embodiment, the rough surface is obtained by the deposition of the polymerizable composition by roll coating with an application speed fast enough to create instabilities at the surface and a crosslinking carried out fast enough to set these instabilities.

According to another embodiment, the roughness is obtained by depositing the polymerizable composition by roll coating with a textured roll. The polymerizable composition is then crosslinked. The textured pattern of the roll imparts the required roughness. According to this embodiment, the rough surface is obtained owing to the use of a textured roll.

According to another embodiment, the roughness is obtained by depositing the polymerizable composition followed by the embossing of the surface. The embossing makes it possible to create raised shapes at the surface of the polymerizable composition. The polymerizable composition is then crosslinked. The raised shapes impart the required roughness. According to this embodiment, the rough surface is obtained by embossing the surface of the polymerizable composition once deposited and before crosslinking.

According to another embodiment, the roughness may be obtained by adding particles, preferably organic particles, dispersed in the polymer matrix of the temporary protective layer. These particles must have sufficient dimensions to partially jut out at the surface of the polymer matrix or to generate surface flatness defects and thus impart the required roughness.

The surface roughness of the temporary protective layer may be characterized by its period and its amplitude. The parameters chosen to characterize the amplitude are the surface roughness parameters defined according to the standard ISO 251783:
Sa: arithmetic mean height of the profile of the surface,
Sz: maximum height of the profile of the surface, from the highest point to the deepest valley,
sq: quadratic mean height of the profile of the surface.

The period is defined by two-dimensional roughness parameter RSM according to the standard ISO 4287.

In the present application, the roughness parameters are obtained in the following manner: representative surfaces of around (10 to 15)×(10 to 15) mm² were analyzed on each sample. Preferably, three different positions are chosen for each sample. These images are obtained by interference profilometry using the Zygo Newview™ profilometer with a magnification of ×0.5. The data were then processed by the MountainsMap® software.

The three-dimensional surface roughness parameters were calculated by using an appropriate analysis length combined with an appropriate low-pass Gaussian filter (ISO 16610-21 for the profiles). The analysis length and the low-pass filter choice are judiciously selected in order to distinguish the waviness parameters from the roughness parameters. In the present application, an analysis length of the profile of around 15 mm and a low-pass Gaussian filter of 2.5 mm were used.

The rough surface has a surface roughness parameter Sz corresponding to the maximum height of the profile of the surface, in order of increasing preference, of:
  greater than 1.0 μm, greater than 2.0 μm, greater than 3.0 μm, greater than 4.0 μm, greater than 5.0 μm, and/or less than 15.0 μm, less than 10.0 μm, less than 9.0 μm, less than 8.0 μm, less than 7.0 μm.

Advantageously, the surface roughness parameter Sz, corresponding to the maximum height of the surface, represents, in order of increasing preference, at least 10%, at least 20%, at least 30%, at least 40%, of the mean thickness of the temporary protective layer.

The temporary protective layer is continuous. This means that the temporary layer does not consist of a stack of discernible colloidal polymer particles as described in application WO 2009/153490. This means that the surface roughness parameter Sz does not represent 100% of the mean thickness of the temporary protective layer. Preferably, the surface roughness parameter Sz represents, in order of increasing preference, at most 80%, at most 70%, at most 60%, at most 50% of the mean thickness of the temporary protective layer. The surface roughness has a surface roughness parameter Sa corresponding to the arithmetic mean height of the profile of the surface, in order of preference, of:
  greater than 0.2 μm, greater than 0.3 μm, greater than 0.4 μm, and/or
  less than 5.0 μm, less than 4.0 μm, less than 3.0 μm, less than 2.0 μm, less than 1.5 μm, less than 1.0 μm.

Advantageously, the surface roughness parameter Sa, corresponding to the arithmetic mean height of the profile of the surface, represents, in order of increasing preference, at least 1%, at least 2%, at least 3%, of the mean thickness of the temporary protective layer.

The rough surface has a surface roughness parameter Sq corresponding to the quadratic mean height of the profile of the surface, in order of increasing preference, of:
  greater than 0.2 μm, greater than 0.3 μm, greater than 0.4 μm, and/or
  less than 5.0 μm, less than 4.0 μm, less than 3.0 μm, less than 2.0 μm, less than 1.5 μm, less than 1.0 μm.

The rough surface has a roughness parameter Rsm, corresponding to the mean width of the elements of the profile, in order of increasing preference, of:
  greater than 0.5 mm, greater than 0.6 mm, greater than 0.8 mm, greater than 1 mm, and/or
  less than 5.0 mm, less than 4.0 mm, less than 3.0 mm, less than 2.0 mm, less than 1.5 mm.

The surface roughness may be composed of flatness defects or of printed patterns having a random, oriented or ordered arrangement. According to the invention, it is sufficient for an article to satisfy the claimed roughness parameter(s) in one direction. Indeed, when the roughness is obtained by means of flatness defects in the form of wavelets, only a measurement of the roughness parameters perpendicular to the wavelets summarizes the maximum height differences of the patterns.

In the remainder of the text, the preferred embodiments apply in the same manner to the various subjects of the invention, the article and the process.

The temporary protective layer according to the invention is specifically intended to be removed during a thermal tempering at a sufficient temperature to enable the removal thereof by thermal decomposition without damaging the optical, energy or thermal properties of the substrate optionally bearing a functional coating. One and the same heat treatment step of the protected substrate makes it possible to remove the protective layer from the substrate and to give the substrate certain properties or conformation (tempered and/or curved substrate).

The temporary protective layer advantageously has the following features:
  it has a thickness of at least 1 micrometer,
  it is insoluble in water,
  it is obtained from a polymerizable composition comprising (meth)acrylate compounds,
  it is cured by drying, by IR curing, by UV irradiation or by electron beam.

Advantageously, the temporary protective layer has a thickness, in order of increasing preference, of:
  greater than 1 μm, greater than 5 μm, greater than 10.0 μm, greater than 12.0 μm,
  less than 50.0 μm, less than 40.0 μm, less than 30.0 μm, less than 25.0 μm, less than 20.0 μm.

The thicknesses may be measured using a Dektak profilometer.

The polymer matrix represents at least 80% by weight of the temporary protective layer.

The temporary protective layer essentially comprises organic materials of (meth)acrylate polymer type. Its chemical formulation enables rapid and complete combustion during a heat treatment and during its decomposition only generates volatile molecules that are easy to eliminate.

The temporary protective layer is obtained from a polymerizable composition. The polymerizable composition comprises (meth)acrylate compounds chosen from monomers, oligomers, prepolymers or polymers comprising at least one (meth)acrylate function.

Preferably, the polymer matrix is obtained from a polymerizable composition comprising polymerizable organic compounds, preferably (meth)acrylate compounds. The (meth)acrylate compounds that have reacted with one another representing at least 80%, preferably at least 90%, or even 100% by weight of the polymer matrix.

The application of a temporary protective layer obtained from a liquid composition that is essentially free of solvents and is preferably cured by UV irradiation, by IR curing or by an electron beam is particularly advantageous. The choice of this solvent-free technology considerably simplifies the industrial implementation of a process comprising a step of applying such a layer. The absence of solvent makes it possible to avoid installing a device for drying, recovering and treating the solvent vapors that must not be emitted into the atmosphere. The modifications to be made may be limited to inserting, at the end of the line, a deposition device, for example a roll coater deposition device and also a crosslinking device such as a UV lamp.

The temporary protective layer according to the invention is preferably applied at the outlet of the line for manufacturing substrates bearing functional coatings. The step of depositing the temporary protective layer may be easily integrated into the process for manufacturing the substrate bearing the functional coating.

The polymerizable composition has, owing to the judicious choice of the (meth)acrylate compounds, a viscosity suitable for making it possible to easily obtain a temporary protective layer having a thickness greater than or equal to 1 μm and a sufficient reactivity in order to enable virtually instantaneous crosslinking throughout the thickness. The chemical nature, the degree of crosslinking, the density and also the thickness of the temporary protective layer contribute to obtaining effective protection against abrasion, the appearance of scratches and corrosion. These protective properties are obtained for thicknesses of less than 50 micrometers.

Finally, the absence of solvent coupled with the virtually instantaneous curing, for example by UV irradiation or by an electron beam, makes it possible to obtain protected substrates with no effect on the production rates. Advantageously, the coating rates are compatible with the rates of deposition of the functional coatings which enables continuous manufacture of substrates bearing a functional coating and a temporary protective layer according to the invention. For example, the rates of application of the temporary protective layer, comprising for example the coating and the crosslinking, may be between 1 and 90 m/min on a substrate having a width of from 1 m to 3.3 m.

This water-insoluble temporary protective layer makes it possible to obtain effective protection during the washing step and against wet corrosion. The protection is maintained even when the substrate undergoes successive cutting operations. Indeed, the substrates protected according to the invention appear to be protected from corrosion mechanisms that could be initiated on the one hand on the full face but also from the cutting edge. The substrates protected according to the invention may therefore be cut several times without it being necessary to modify the protective layer and without losing the mechanical and chemical protection functions.

Preferably, the protected substrate, that is to say the substrate bearing the temporary protective layer has not undergone a heat treatment of tempering, annealing and/or bending type, that is to say heat treatment at a temperature above 200° C. or above 400° C. The protected substrate is not tempered and/or curved.

Although the invention is very particularly suitable for the protection of substrates bearing mechanically weak functional coatings, the solution of the invention may be applied to the protection of substrates bearing any type of functional coating.

According to one embodiment, the substrate is coated with a functional coating deposited on at least one portion of a main surface and the temporary protective layer is deposited on at least one portion of the functional coating.

Preferably, the substrate bearing the functional coating has not undergone a high-temperature heat treatment of tempering, annealing and/or bending type, that is to say heat treatment at a temperature above 200° C. or above 400° C. This means that the article formed by the substrate and the functional coating has not undergone a high-temperature heat treatment. This also means that the process does not comprise a step of high-temperature heat treatment, that is to say heat treatment at a temperature above 200° C. or above 400° C., between the deposition of the functional coating and the deposition of the temporary protective layer.

The functional coating reflects infrared rays. The functional coating may be conventionally deposited by sputtering. The industrial deposition process consists in running the substrates on a continuous production line comprising one or more vacuum deposition chambers.

The functional coating comprises at least one functional layer. The functional layer is preferably a layer that can act on solar radiation and/or infrared radiation of long wavelength. These functional layers are for example metallic functional layers based on silver or on a metal alloy containing silver.

The substrate may comprise a functional coating comprising a stack of thin layers successively comprising, starting from the substrate, an alternation of n functional metallic layers, in particular functional layers based on silver or on a metal alloy containing silver, and of (n+1) antireflection coatings, each antireflection coating comprising at least one dielectric layer, so that each functional metallic layer is positioned between two antireflection coatings. Preferably, n is equal to 1, 2, 3 or 4. Even more preferably, n is greater than 1, in particular n is equal to 2 or 3.

The substrate may comprise a stack of thin layers successively comprising, starting from the substrate, an alternation of two functional metallic layers, in particular functional layers based on silver or on a metal alloy containing silver, and of three antireflection coatings, each antireflection coating comprising at least one dielectric layer, so that each functional metallic layer is positioned between two antireflection coatings.

The substrate may also comprise a stack of thin layers successively comprising, starting from the substrate, an alternation of three functional metallic layers, in particular functional layers based on silver or on a metal alloy containing silver, and of four antireflection coatings, each antireflection coating comprising at least one dielectric layer, so that each functional metallic layer is positioned between two antireflection coatings.

The thickness of the functional coating is:
greater than 100 nm, preferably greater than 150 nm,
less than 300 nm, preferably less than 250 nm.

According to one particularly advantageous embodiment of the invention, the functional coating comprises an upper layer chosen from nitrides, oxides or oxynitrides of titanium and/or of zirconium. The upper layer of the functional coating is the layer furthest from the substrate and/or the layer in direct contact with the temporary protective layer.

The upper layer may in particular be a layer:
of titanium nitride; of zirconium nitride; of hafnium nitride; of titanium zirconium nitride; of titanium zirconium hafnium nitride;
of titanium oxide; of zirconium oxide; of hafnium oxide; of titanium zirconium oxide; of titanium zirconium hafnium oxide.

The thickness of these upper layers is preferably between 1 and 20 nm and better still between 1 and 5 nm.

According to one variant, the upper layer may be a silicon nitride layer, optionally doped with aluminum. The thickness of this upper layer is preferably between 5 and 50 nm and better still between 10 and 50 nm.

The functional coating may be deposited by any known means such as by magnetron sputtering, by thermal evaporation, by CVD or PECVD, by pyrolysis, by chemical deposition, by sol-gel deposition or wet deposition of inorganic layers.

The functional coating is preferably deposited by magnetron sputtering. According to this advantageous embodiment, all the layers of the functional coating are deposited by magnetron sputtering. The temporary protective layer is advantageously directly in contact with the functional coating.

The temporary protective layer is essentially of organic nature. The (meth)acrylate compounds that have reacted together represent at least 90% by weight of the weight of the temporary protective layer.

The term "(meth)acrylate" is understood to mean an acrylate or a methacrylate. The expression "(meth)acrylate compounds" is understood to mean the esters of acrylic or methacrylic acid comprising at least one acryloyl ($CH_2$=CH—CO—) or methacryloyl ($CH_2$=CH($CH_3$)—CO—) function. These esters may be monomers, oligomers, prepolymers or polymers. These (meth)acrylate compounds, when they are subjected to the polymerization conditions, give a polymer network endowed with a solid structure.

The (meth)acrylate compounds used according to the invention may be selected from monofunctional and polyfunctional (meth)acrylates such as mono-, di-, tri- and poly-functional (meth)acrylates. Examples of such monomers are:
- monofunctional (meth)acrylates such as methyl (meth)acrylate, ethyl (meth)acrylate, n- or tert-butyl (meth)acrylate, hexyl (meth)acrylate, cyclohexyl (meth)acrylate, 2-ethylhexyl (meth)acrylate, benzyl (meth)acrylate, 2-ethoxyethyl (meth)acrylate, phenoxyethyl (meth)acrylate, hydroxyethyl acrylate, hydroxypropyl (meth)acrylate, vinyl (meth)acrylate, caprolactone acrylate, isobornyl methacrylate, lauryl methacrylate, polypropylene glycol monomethacrylate,
- difunctional (meth)acrylates such as 1,4-butanediol di(meth)acrylate, ethylene dimethacrylate, 1,6-hexanediol di(meth)acrylate, bisphenol A di(meth)acrylate, trimethylolpropane diacrylate, triethylene glycol diacrylate, ethylene glycol di(meth)acrylate, polyethylene glycol di(meth)acrylate, tricyclodecane dimethanol diacrylate,
- trifunctional (meth)acrylates such as trimethylolpropane trimethacrylate, trimethylolpropane triacrylate, pentaerythritol triacrylate, ethoxylated trimethylolpropane triacrylate, trimethylolpropane trimethacrylate, tripropylene glycol triacrylate,
- (meth)acrylates of higher functionality such as pentaerythritol tetra(meth)acrylate, ditrimethylpropane tetra(meth)acrylate, dipentaerythritol penta(meth)acrylate or hexa(meth)acrylate.

The temporary protective layer does not comprise additives that are not capable of being eliminated during the heat treatment such as silicon-comprising organic compounds of siloxane type.

The temporary protective layer has a thickness:
- greater than 1 micrometer, preferably greater than 5 micrometers,
- less than 100 micrometers, preferably less than 50 micrometers,
- between 2 and 100 micrometers, between 5 and 50 micrometers or between 10 and 30 micrometers.

The temporary protective layer has a grammage between 5 and 50 g/m$^2$, preferably between 10 and 30 g/m$^2$.

According to advantageous embodiments of the invention, the polymerizable composition has the following features:
- the polymerizable composition comprises less than 20% by weight of solvent with respect to the total weight of the liquid composition,
- the polymerizable composition comprises less than 10% by weight of solvent with respect to the total weight of the liquid composition,
- the polymerizable composition is solvent-free,
- the polymerizable composition has a viscosity measured between 20° C. and 25° C. limits included:
  - of at least 0.05 Pa·s, of at least 0.08 Pa·s, of at least 0.1 Pa·s, of at least 0.50 Pa·s,
  - of at most 5 Pa·s, of at most 2 Pa·s,
  - between 0.05 and 5 Pa·s;
- the polymerizable composition comprises at least one polymerization initiator, preferably a photoinitiator,
- the polymerization initiator represents 0.1% to 20%, or 1% to 15%, preferably 5% to 15% and better still 8% to 12% by weight of the total weight of the (meth)acrylate compounds,
- the polymerizable composition additionally comprises at least one additive selected from plasticizers, absorbers, separating agents, heat and/or light stabilizers, thickeners or surface modifiers,
- the sum of all the additives is between 0 and 5% by weight of the weight of the liquid composition,
- the (meth)acrylate compounds selected from esters of acrylic or methacrylic acid comprising at least two acryloyl ($CH_2$=CH—CO—) or methacryloyl ($CH_2$=CH($CH_3$)—CO—) functions,
- the polymerizable composition comprises, by weight with respect to the total weight of the (meth)acrylate compounds, in order of increasing preference, at least 50%, at least 60%, at least 70%, at least 80%, at least 90% or 100% of (meth)acrylate compounds selected from esters of acrylic or methacrylic acid comprising at least two acryloyl ($CH_2$=CH—CO—) or methacryloyl ($CH_2$=CH($CH_3$)—CO—) functions,
- the polymerizable composition comprises:
  - at least one aliphatic urethane-acrylic oligomer,
  - at least one (meth)acrylate monomer selected from mono-, bi- or tri-functional (meth)acrylate monomers,
  - at least one polymerization initiator,
- the polymerizable composition comprises:
  - at least one aliphatic urethane-acrylic oligomer,
  - at least one difunctional (meth)acrylate monomer,
  - at least one trifunctional (meth)acrylate monomer,
  - at least one polymerization initiator, preferably a photoinitiator,
- the polymerizable composition comprises, by weight with respect to the total weight of the (meth)acrylate compounds:
  - 30% to 80% by weight of at least one aliphatic urethane-acrylic oligomer,
  - 20% to 70% by weight of at least one (meth)acrylate monomer selected from a mono-, bi- or tri-functional (meth)acrylate.

According to the invention, the polymerization initiators are not considered to be additives.

The polymerizable composition may be applied at ambient temperature by any known means and in particular by roll coating, flow coating, dip coating, curtain coating or spray coating. The polymerizable composition is preferably applied by roll coating. The rate of deposition of the liquid composition may be between 1 and 90 m/min.

The temporary protective layer may be cured:
by drying at a temperature below 200° C. for a duration ranging for example from 10 s to 180 s,
by UV (various wavelengths) crosslinking preferably in open air and at ambient temperature or
by an electron beam.

The polymerizable composition additionally comprises a polymerization initiator, the nature of which depends on the type of curing selected. For example, in the case of thermal curing, initiators of benzoyl peroxide type are used. In the case of curing by UV radiation, initiators referred to as photoinitiators are used.

The substrate to be protected must withstand a heat treatment of tempering type. The invention therefore relates to any substrate capable of being tempered. The substrate is preferably a glass substrate.

Advantageously, the substrate bearing the temporary protective layer has not undergone a heat treatment of tempering, annealing and/or bending type, that is to say heat treatment at a temperature above 200° C.

The glass substrate may be flat, colorless and/or colored. The thickness of the substrate is preferably between 1 and 19 mm, more particularly between 2 and 10 mm, or even between 3 and 6 mm.

According to one variant of the invention, the temporary protective layer may be used to protect the functional coating during a step of depositing another coating. This other coating may be deposited on a portion of the main surface of the substrate that bears the functional coating or on a portion of the main surface of the substrate that does not bear the functional coating.

It is in particular known that to obtain bi-functionalized substrates bearing a functional coating on each main face, the contact of the functional coating deposited first with the rolls of the deposition device during the second pass enabling the deposition of the second coating leads to alterations that are damaging to the quality of the first coating (pollution, scratches). These alterations becoming visible after deposition of the second functional coating and optionally tempering. The invention makes it possible to overcome this problem by protecting the first coating with a protective layer intended to disappear during the tempering or bending of the bifunctionalized substrate.

According to another variant of the invention, the temporary protective layer may be used to protect the rear surface of the substrate during the deposition of a functional coating. Indeed, the passage on the rolls of the rear face of a substrate, for example made of glass, during the deposition of a functional coating, is capable of partially altering said surface (soiling, scratching). The invention makes it possible to overcome this problem by protecting the rear surface of the substrate before deposition of the first coating.

The temporary protective layer may be deposited:
on each of the main surfaces of the substrate and/or
on at least one edge of the substrate and/or
on each of the edges of the substrate.

When the temporary protective layer is deposited on each of the main surfaces of the substrate and on each of the edges of the substrate, the chemical and/or mechanical protection is then conferred on the entire surface area of the substrate.

The temporary protective layer may be deposited on a glass substrate before or after a cutting step, that is to say on a glass substrate that is at the final size or close to the final size (crude).

The invention also relates to the process for obtaining an article treated at high temperature. The heat treatment temperature is above 200° C., above 300° C., or above 400° C. The heat treatments are selected from tempering and/or bending.

The heat treatment needed for removing the protective layer may be annealing in a static or dynamic furnace. The heat treatment may then have the objective of improving the crystallization of one or more layers included in the stack to be protected.

The functional coating comprises at least one functional layer deposited during a magnetron deposition step.

The process of the invention comprises one or more of the following features:
the polymerizable composition is applied by roll coating,
the polymerizable composition has a viscosity measured between 20° C. and 25° C. limits included, of between 0.05 and 5 Pa·s limits included;
the rough surface is obtained by deposition by roll coating with an application speed fast enough to create instabilities at the surface and a crosslinking carried out fast enough to set these instabilities,
the rough surface is obtained owing to the use of a textured roll,
the rough surface is obtained by embossing the surface of the polymerizable composition once deposited and before crosslinking,
the functional coating is deposited by magnetron sputtering and in that the temporary protective layer is directly in contact with the functional coating,
the temporary protective layer is crosslinked by UV crosslinking,
it comprises a step of washing with water between the protecting step and the heat treating and deprotecting step during which the temporary protective layer is not removed.

The temporary protective layer is formed immediately after the step of depositing the functional coating. According to the invention, it is considered that the temporary protective layer may be formed "immediately after", when the temporary protective layer may be formed less than 10 minutes, preferably less than 5 minutes and better still less than 1 minute after the step of depositing the functional coating.

The temporary protective layer according to the invention may be applied to large-size glass substrates, in particular to glass substrates referred to as large-format jumbo (PLF) glass substrates. These glass substrates therefore have at least one dimension, in general the width, corresponding to the width of the glass ribbon from which they are derived. The other dimension, in general the length, corresponds to the length of cut ribbon. Jumbo glass substrates typically have dimensions of 3.21 m by around 6 m.

According to one embodiment, the article comprises a glass substrate having at least one dimension of greater than 3 m, or even of greater than 6 m.

According to another embodiment, the article comprises a glass substrate having at least two dimensions of greater than 3 m, or even one dimension of greater than 3 m and one dimension of greater than 6 m.

The protective glass substrate according to the invention may be stacked without cross contamination, nor appearance of mechanical scratches, immediately after deposition of the functional coatings.

EXAMPLES

I. Materials Used

Figure 1:
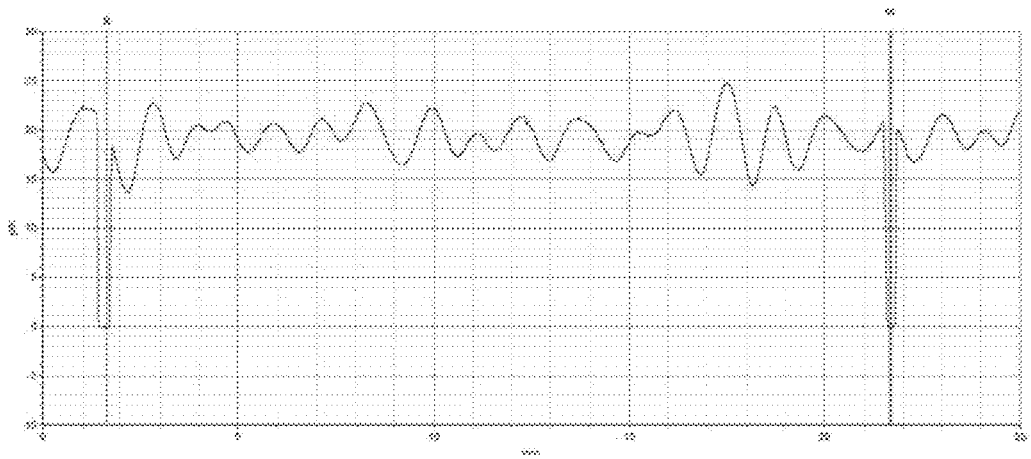
FIG. 1 shows a thickness measurement by a profilometer.

1. Substrates Coated with the Functional Coating

The substrates used are flat glass substrates having a thickness of around 6 mm obtained by a float process.

The functional coatings comprise a stack of thin layers deposited by means of a magnetron sputtering device.

The stack of thin layers successively comprises, starting from the substrate, an alternation of three dielectric coatings and of two silver layers (functional metallic layers), each dielectric coating comprising at least one dielectric layer, so that each functional metallic layer is positioned between two dielectric coatings. The layer of the functional coating furthest from the substrate is a 1 to 5 nm layer of titanium zirconium nitride. The total thickness of this functional coating is between 150 and 200 nm.

2. Preparation of the Polymerizable Compositions

The polymerizable compositions were prepared. These compositions comprise the constituents of the polymer matrix, polymerization initiators and optionally additives.

The constituents of the polymer matrix comprise oligomers, monomers and optionally prepolymers. A mixture of oligomers and monomers comprising at least one acrylate function sold by Sartomer was used with, in particular:

CN9276: tetrafunctional aliphatic urethane-acrylate oligomer,

SR351: trimethylolpropane triacrylate, trifunctional acrylate monomer,

SR833S: tricyclodecane dimethanol diacrylate, difunctional acrylate monomer.

The presence of the urethane-acrylate oligomer makes it possible to adjust the hardness and flexibility properties of the temporary protective layer.

The polymerization initiator used in these examples is Irgacure® 500 or Irgacure® 184, sold by BASF.

The various constituents and additives are mixed by ultrasonic mixing.

The compositions tested are defined in the table below in parts by weight.

| Composition | Parts by weight | Viscosity |
| --- | --- | --- |
| Polymer matrix: | | |
| acrylate oligomer | 60 | 5.8 Pa.s |
| difunctional acrylate | 20 | 140 mPa.s |
| trifunctional acrylate | 20 | 110 mPa.s |
| UV initiator | +10 | — |

The viscosity of the polymerizable composition is measured using an Anton Parr viscometer or the no. 5 Ford cup. The polymerizable composition has a viscosity at 20° C. of 0.8±0.1 Pa·s 3. Preparation of the Articles Tested

| Articles | F | E | R1 | R2 |
| --- | --- | --- | --- | --- |
| Substrate + Functional coating | Yes | Yes | Yes | Yes |
| Polymerizable composition | No | E | E | E |

The article E corresponds to an article as described in application WO 2015/019022. This article does not have the roughness as claimed. The polymerizable composition is applied to the glass substrate coated with the functional coating by roll coating. The applicator roll rotates at a speed between 15 and 25 m/min. The run speed of the substrate is also between 15 and 25 m/min. The temporary layer is crosslinked by UV radiation. The thicknesses of polymerizable compositions deposited are between 10 and 20 μm.

The article R1 corresponds to an article according to the invention. The polymerizable composition is applied to the glass substrate coated with a functional coating by roll coating. The applicator roll rotates at a speed of around 40 m/min. The run speed of the substrate is also 40 m/min. The temporary layer is immediately crosslinked by UV radiation. The article R1 according to the invention has a roughness as claimed. The thickness of polymerizable composition deposited corresponds to the thickness of the temporary protective layer and is between 10 and 20 μm.

The temporary protective layers are obtained by crosslinking by UV radiation provided by a mercury lamp having a power of 120 W.

The article R2 corresponds to an article according to the invention. The polymerizable composition would have been applied to the glass substrate coated with the functional coating by spin coating. The surface roughness is obtained by the process as described in application FR 2990384. A pattern is printed on the surface using a polydimethylsiloxane PDMS stamp. The process of printing the pattern comprises the following steps:

applying the stamp to the surface of the layer of polymerizable composition, introducing the article coated with the polymerizable composition and the stamp into a pouch made of an impermeable material, introducing the pouch and its contents into a hermetic chamber, placing the chamber under vacuum, sealing the pouch before reintroducing air into the chamber, UV crosslinking separating the article and the stamp.

The surface roughness of the stamp is defined by the following parameters:

Sa: 0.7 μm,

Sz: 7 μm

Rsm: 7 μm.

II. Characterization

1. Thicknesses

The thicknesses can be measured using a Dektak profilometer. Two scratches spaced around 2 cm apart are used to correct the baseline and position the substrate at 0 μm, as shown in FIG. 1. The thickness is obtained by taking the mean value of the profile between the two scratches.

In the case of the article R1, the roughness corresponds to flatness defects in the form of wavelets. The profile is produced perpendicular to these wavelets.

The thicknesses of the temporary protective layers obtained under these conditions are from 10 to 20 μm.

2. Determination of the Surface Roughness

Figure 2:
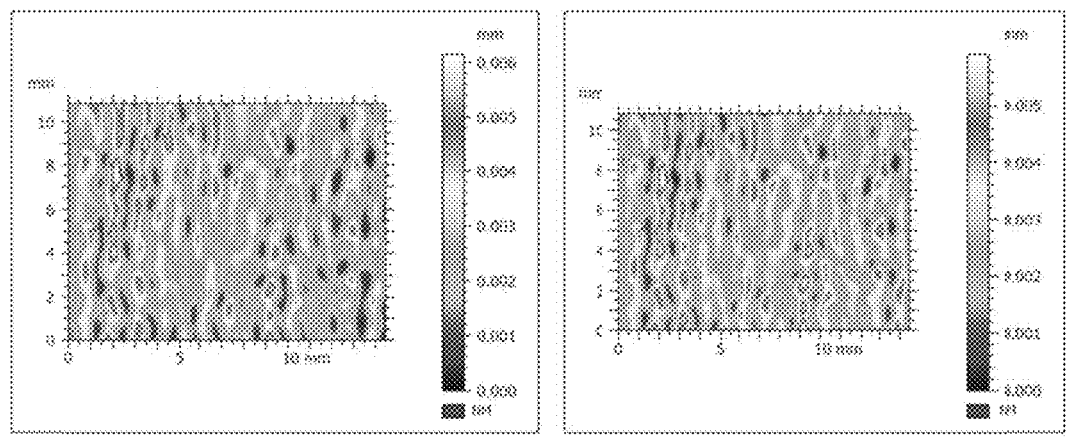
FIG. 2 illustrates two-dimensional profiles of the surface before correction (left image) and after correction (right image)

The surface roughness was determined using a Newview® interference profilometer from Zygo. FIG. 2 illustrates two-dimensional profiles of the surface before correction (left image) and after correction (right image).

The 2D profile is produced at 3 different positions for each sample with a magnification of ×0.5 using an image A of 14.49×10.87 mm². On the images presented, a roughness in the form of wavelets is clearly seen.

The data are then processed using the MountainsMap® software. In a first step, the background is rectified by subtracting a plane (cf. FIG. 2, right image). The roughness parameters are calculated, on the corrected image, according to the standard ISO 25178, by using an analysis length of the profile of around 15 mm combined with a low-pass Gaussian filter of 2.5 mm (ISO 13565-1 for the profiles). These parameters are judiciously selected in order to distinguish the waviness parameters from the roughness parameters. Sa and Sq correspond to the arithmetic mean height of the profile and the quadratic mean height of the profile of the surface. Sz corresponds to the maximum height of the profile of the surface.

The image is then broken down into 480 horizontal profiles, i.e. profiles perpendicular to the roughness. The software calculates the mean period Rsm and its standard deviation for each profile.

| Articles<br>Thicknesses (e) | E<br>15 µm | R1<br>15 µm | R2<br>15 µm |
|---|---|---|---|
| Roughness parameter: | | | |
| Sa | 0.10 ± 0.05 µm | 0.68 ± 0.05 µm | 0.53 ± 0.05 µm |
| Sz | 0.53 ± 1 µm | 7.2 ± 1 µm | 5.8 ± 1 µm |
| Sq | 0.13 ± 0.05 µm | 0.86 ± 0.05 µm | 0.66 ± 0.05 µm |
| Rsm | 1.5 ± 0.1 mm | 1.1 ± 0.1 mm | 1.1 ± 0.1 mm |
| (Sa/(e))*100 | 0.67% | 4.5% | 3.5% |
| (Sz/(e))*100 | 3.5% | 48% | 39% |

The protected articles R1 and R2 each have:
- a surface roughness parameter Sa, representing at least 3% of the mean thickness of the temporary protective layer,
- a surface roughness parameter Sz, corresponding to the maximum height of the surface, representing at least 30% of the mean thickness of the temporary protective layer.

3. Adhesion Test

Small sheets measuring 10 cm×10 cm were bought into contact on a flat glass substrate measuring 30 cm×30 cm that had been washed with water then dried (hereinbelow large sheet):
- a sheet of Article F (comparative) fastened with 4 pieces of adhesive tape,
- a sheet of Article F (comparative) fastened with a clip,
- a sheet of Article E (comparative) fastened with 4 pieces of adhesive tape,
- a sheet of Article E (comparative) fastened with a clip,
- a sheet of Article R1 (invention) fastened with 4 pieces of adhesive tape,
- a sheet of Article R1 (invention) fastened with a clip.

Figure 3:
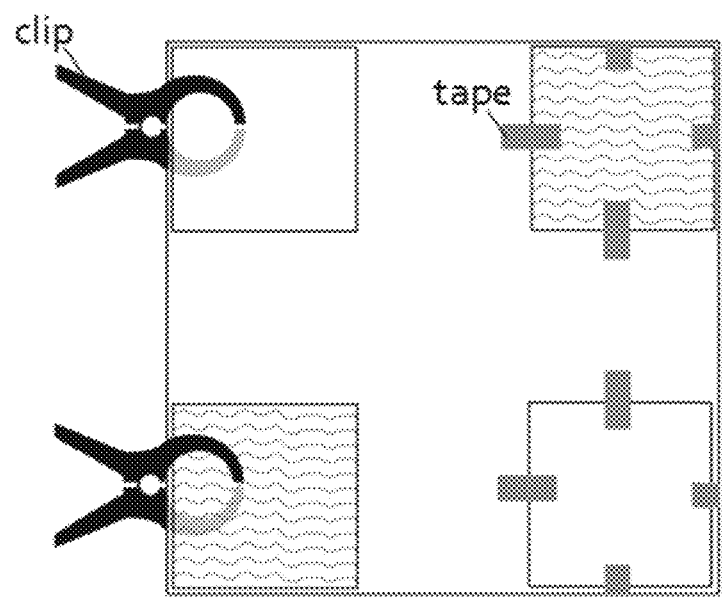
FIG. 3 illustrates an adhesion test.

FIG. 3 illustrates this test.

The assembly is then wetted with tap water and dried rapidly with compressed air. Water remains trapped between the sheets and the glass substrate. Then the assembly is left to dry for 4 days. After 4 days, the clips and the adhesive tape are removed.

The two sheets of article F not comprising the temporary protective layer adhere to the large sheet. They cannot be detached from the large glass sheet. Nor is it possible to move the sheets F in translation relative to the large sheet.

The two sheets of article E comprising a temporary protective layer as described in application WO 2015/019022 adhere to the large sheet. They cannot be detached from the large glass sheet. Nor is it possible to move the sheets E in translation relative to the large sheet.

The two sheets of article R1 according to the invention do not adhere to the large sheet. They can easily be moved and detached from the large glass sheet.

The invention claimed is:

1. An article comprising a glass substrate comprising two main faces defining two main surfaces separated by edges and a temporary protective layer comprising an organic polymer matrix deposited on at least one portion of a main surface of the glass substrate, wherein the temporary protective layer is obtained from a polymerizable composition comprising (meth)acrylate compounds and has a rough surface defined by a surface roughness parameter Sa, corresponding to the arithmetic mean height of the profile of the surface, of greater than 0.2 µm and less than 5.0 µm.

2. The article as claimed in claim 1, wherein the rough surface has a surface roughness parameter Sz, corresponding to the maximum height of the profile of the surface, of greater than 1.0 µm.

3. The article as claimed in claim 1, wherein the rough surface has a roughness parameter Rsm, corresponding to a mean width of the elements of the profile, of greater than 0.5 mm.

4. The article as claimed in claim 1, wherein the surface roughness parameter Sa, corresponding to the arithmetic mean height of the profile of the surface, represents at least 1% of a mean thickness of the temporary protective layer.

5. The article as claimed in claim 1, wherein the surface roughness parameter Sz, corresponding to the maximum height of the surface, represents at least 10% of a mean thickness of the temporary protective layer.

6. The article as claimed in claim 1, wherein the substrate is coated with a functional coating deposited on at least one portion of a main surface and the temporary protective layer is deposited on at least one portion of the functional coating.

7. The article as claimed in claim 1, wherein the functional coating comprises a stack of thin layers successively comprising, starting from the substrate, an alternation of n functional metallic layers based on silver or on a metal alloy containing silver, and of (n+1) antireflection coatings, each antireflection coating comprising at least one dielectric layer, so that each functional metallic layer is positioned between two antireflection coatings.

8. The article as claimed in claim 1, wherein the roughness is in a form of wavelets.

9. The article as claimed in claim 8, wherein said wavelets are formed by a deposition roll and the wavelets are parallel to an axis of rotation of the deposition roll.

10. The article as claimed in claim 1, wherein the roughness is formed by stamping the polymerizable composition with a stamp having a predetermined pattern.

11. The article as claimed in claim 1, wherein the glass substrate has at least one dimension of greater than 3 m.

12. The article as claimed in claim 11, wherein the at least one dimension is greater than 6 m.

13. The article as claimed in claim 1, wherein the glass substrate has at least two dimensions of greater than 3 m, or even one dimension of greater than 3 m and one dimension of greater than 6 m.

* * * * *